(No Model.)
I. W. NORCROSS.
Lumber Boom.
No. 238,954. Patented March 15, 1881.
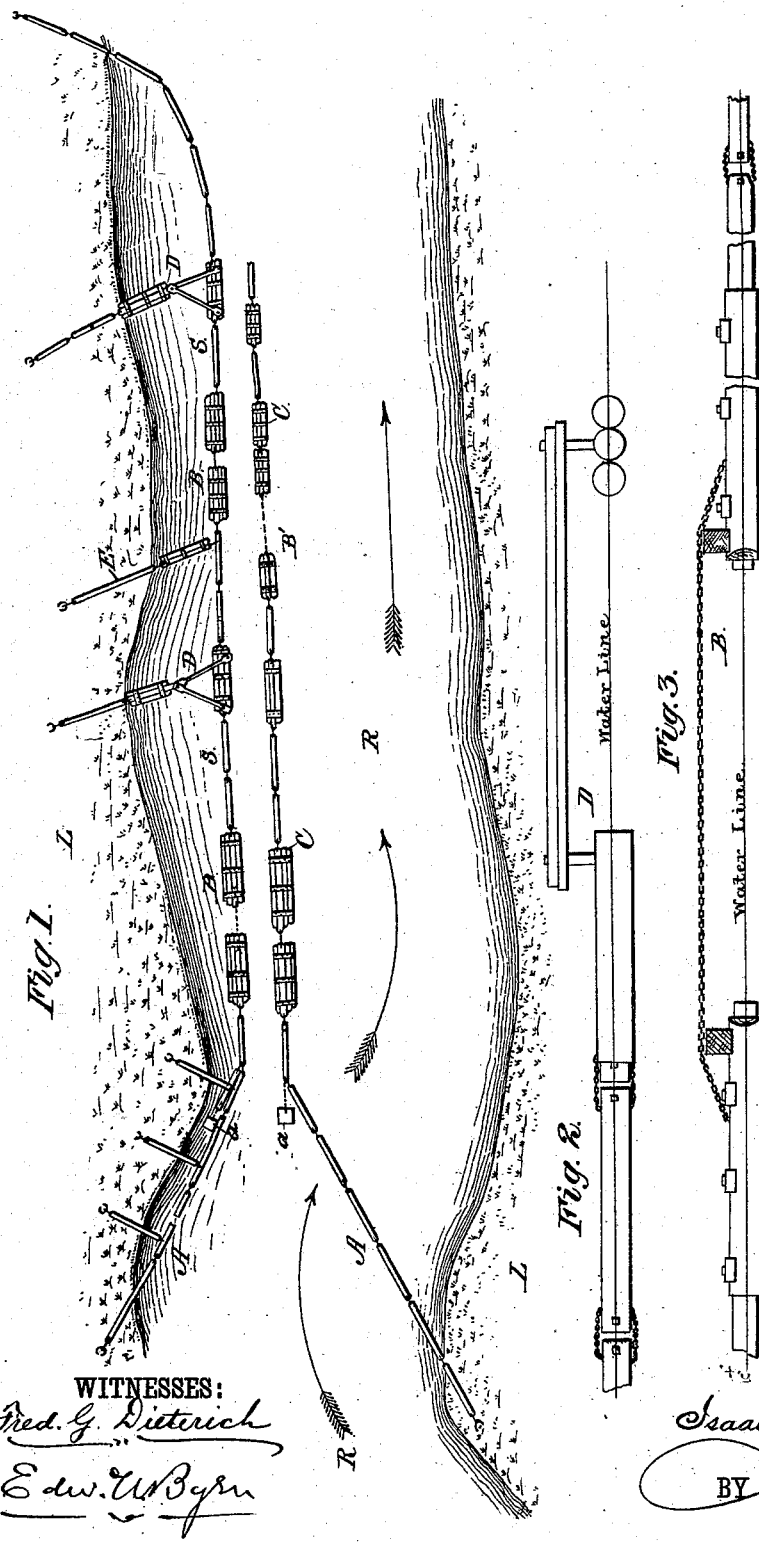
WITNESSES:
Fred. G. Dieterich
Edw. W. Byrn
INVENTOR:
Isaac W. Norcross
BY
ATTORNEYS.

UNITED STATES PATENT OFFICE.

ISAAC W. NORCROSS, OF RED RIVER IRON WORKS, ASSIGNOR OF ONE-HALF TO ARCHER, MANCOURT & CO., OF FRANKFORT, KENTUCKY.

LUMBER-BOOM.

SPECIFICATION forming part of Letters Patent No. 238,954, dated March 15, 1881.

Application filed January 25, 1881. (No model.)

*To all whom it may concern:*

Be it known that I, ISAAC WATTS NORCROSS, of Red River Iron Works, in the county of Estill and State of Kentucky, have invented a new and Improved Lumber-Boom; and I do hereby declare that the following is a full, clear, and exact description of the same, reference being had to the accompanying drawings, forming part of this specification, in which—

Figure 1 is a plan view; Fig. 2, a detail, in side view, of one of the shore-fastenings with outriggers. Fig. 3 is a detail of one of the side gaps.

My invention relates to an improvement in lumber-booms designed to catch and retain logs that are drifted down by the current of the river.

My improvement embodies a drift-sheer, which is in the nature of a series of logs converging toward each other, to gather the timber and the commingled drift, ice, débris, &c., combined with a shore-section having a series of side gaps and a trail-boom floating nearly parallel with the shore-section, which holds the logs and drift as they pass from the drift-sheer close to the side gap; where they are assorted from the drifts and safely placed inside the shore-section, which is divided into a series of pockets by shore-fastenings with outriggers, so as to avoid the cumulative strain of the whole lot of timber by distributing the timber in lots in the several pockets, and thus avoiding the breaking of the boom and loss of logs, which is liable to occur when the cumulative strain of a great number of logs is brought to bear against the boom.

In the drawings, L represents the land on the opposite banks of a river, and R the river-course.

A A is the drift-sheer forming the mouth of the boom, and which is formed of two series of logs, coupled at their ends and having their ends up the stream, anchored on the opposite banks of the same, while their lower ends are made to converge to a comparatively small mouth, into which is guided all the timber, drift, ice, and débris which comes down the river. The ends of this drift-sheer, and also its sides, whenever they require it, are suitably anchored or braced so as to maintain their proper position.

From the lower ends of the drift-sheers there extend the main shore-section S and the trail-boom C, the upper ends of these sections being strongly connected to anchors $a$. The main shore-section is provided with side gaps, B, (see Fig. 3,) re-enforced at their edges by several logs to withstand the bumping incident to steering the logs through the same. This main shore-section S is also anchored to the land by shore-fastenings, a part of which, E, may be directly anchored to the section S and separate the water on opposite sides, and others of which, D, may be connected to the section S by outriggers, (see Fig. 2,) which permit an open communication between the pockets or opposite sides of these fastenings. These shore-fastenings serve not only to hold the main shore-boom S, but they divide the space inside the same into a series of pockets, into which logs are distributed, so as to prevent them from crowding all to one point and straining and possibly breaking the boom. Where these shore-fastenings cross the water the logs are doubled or re-enforced by others, so as to give them the necessary strength to hold the stored-up logs.

The trail-boom C, it will be seen, floats nearly parallel to the main shore-section, and serves to hold the logs in such proximity to the side gaps, B, as to permit the logs to be readily steered into the gaps. This trail-boom is re-enforced at points opposite the water-gaps B, so as to withstand the bumping incident to turning the logs into the gaps; and said trail-boom has also one or more gaps B', through which drift, ice, débris, &c., may be pushed out of the channel and into the main current of the stream.

This boom, it will be seen, has no piers to cause sunken débris to form jams, thereby displacing the current of the river, and making a strong current rush by the pier and draw the logs under the boom.

This boom, without piers, has a uniform pressure at all points, thereby giving security in retaining logs.

Having thus described my invention, what I claim as new is—

1. A lumber-boom consisting of a converging drift-sheer, A, a main shore-section, S, having side gaps, B, and shore-fastenings dividing the space inside the shore-section into pockets, and a trail-boom, C, arranged outside of the shore-section, substantially as and for the purpose described.

2. The combination of shore-section S, having side gaps, B, and the shore-fastenings anchored thereto for the double purpose of holding the shore-section and dividing the space inside the shore-section into pockets, such as described.

3. The combination of a shore-section, S, having side gaps, B, and shore-fastenings, with the trail-boom C, arranged outside of the shore-section, as described.

ISAAC WATTS NORCROSS.

Witnesses:
W. E. WALLER,
J. W. BURTON.